United States Patent [19]

Myers

[11] Patent Number: 5,762,302
[45] Date of Patent: Jun. 9, 1998

[54] ADJUSTABLE HAND REST DEVICE

[76] Inventor: Greg Myers, 4478 Via Marina #P92, Marina Del Rey, Calif. 90292

[21] Appl. No.: 726,131

[22] Filed: Oct. 4, 1996

[51] Int. Cl.$^6$ .................................................. B43L 15/00
[52] U.S. Cl. ................................ 248/118.5; 400/715
[58] Field of Search .......................... 248/118.5, 918, 248/205.2, 118.1, 118.3, 118; 400/715; 24/306, 3.1

[56] References Cited

U.S. PATENT DOCUMENTS

| | | | |
|---|---|---|---|
| 105,001 | 7/1870 | Sanborn . | |
| 709,114 | 9/1902 | Rockwell | 248/118.5 |
| 3,501,774 | 3/1970 | Norman | 24/306 X |
| 4,018,217 | 4/1977 | Evans | 248/118.3 X |
| 4,313,585 | 2/1982 | Bricker | 248/118.5 |
| 4,890,571 | 1/1990 | Gaskill | 248/205.2 X |
| 4,973,176 | 11/1990 | Dietrich | 400/715 |
| 5,158,256 | 10/1992 | Gross | 248/118.3 |
| 5,161,760 | 11/1992 | Terbrack | 248/118 |
| 5,165,630 | 11/1992 | Connor | 248/118.1 |
| 5,265,835 | 11/1993 | Nash | 248/918 X |
| 5,340,067 | 8/1994 | Martin et al. | 248/918 X |
| 5,398,896 | 3/1995 | Terbrack | 248/918 X |
| 5,472,161 | 12/1995 | Krukovsky | 248/918 X |
| 5,492,291 | 2/1996 | Otani | 248/118.1 |
| 5,581,277 | 12/1996 | Tajiri | 248/118.1 X |

*Primary Examiner*—Ramon O. Ramirez
*Assistant Examiner*—Long Dinh Phan
*Attorney, Agent, or Firm*—Gene Scott-Patent Law & Venture Group

[57] ABSTRACT

A hand rest device having a horizontally oriented base and a hand rest surface supported above the base by a hole and peg arrangement. The peg, hole or both may be skewed from normal so as to allow the hand rest surface to vary its attitude by rotation of the rest about the base. The base is attached to a data entry device such as an electronic mouse or keyboard by a strap of adjustable length so that the space between the entry device and the hand rest device may be varied.

11 Claims, 2 Drawing Sheets

ADJUSTABLE HAND REST DEVICE

BACKGROUND OF THE INVENTION

1. Field of the Invention

This invention relates generally to hand rest devices, and more particularly to an improved resting device that is designed to support a user's palm, wrist or forearm during the use of a data input device such as a mouse, trackball or keyboard, and specifically, to a hand rest that is adjustable as to the angle or attitude at which the hand is supported.

2. Description of Related Art

Invention and use of hand resting devices are known to the public, as they are frequently used to support hands, wrists, palms or other parts of the body. Most commonly, appendage resting devices are utilized to support and provide comfort to an appendage and prevent it from injury during tedious, repetitive activities.

For example, Bricker U.S. Pat. No. 4,313,585 discloses a rolling support platform device which is provided to assist in drawing, marking and writing. The device includes a metal or plastic platform having three or more socket-shaped, partial knock-outs and a ball bearing in each socket. Sufficient friction is imparted to a bearing by each socket, thereby producing a smooth rolling action without the problems of over rolling.

Unfortunately, this and other similar devices are severely limited in that they are not sized or shaped to support the hand when it is accessing a data entry device. As we continually move toward more and more reliance on electronic devices such as keyboards and computers, it has become increasingly obvious that the positioning of the hands with the wrists bent upwardly while typing or accessing a mouse frequently leads to fatigue, muscle pain and inflammation of the hands, wrists and arms, and over an extended period of time may result in permanent muscle or nerve damage. Therefore, a wide variety of different hand and wrist support configurations have been invented in an attempt to retard or prevent such fatigue and injuries from occurring.

Dietrich U.S. Pat. No. 4,973,176 discloses a portable palm, wrist or forearm rest that includes adjustable supports, a means by which to attach the rest to a data input device and a means for reducing resistance to the movement of the platform. The device provides a light, portable means for supporting a computer, typewriter, keyboard or data input device user's palm, etc. in order to alleviate fatigue. The height of the rest may be adjusted so as to accommodate keyboard height variations. However, even when the device is adjusted to the proper height, it is significantly limited in that while it provides a surface upon which to rest the hands or wrists, it is itself a rigid surface that does not conform to the pressure of the hand, and, over an extended period of time consistently pressing the palm or wrist against its rigid surface may result in fatigue or soreness. In addition, this device has a relatively large number of parts and is therefore somewhat expensive to manufacture. The device is also not designed specifically for attachment to the data input device, which therefore limits its ability to be used in conjunction with moving input devices, such as a mouse.

Connor U.S. Pat. No. 5,165,630 discloses a wrist protector similar to that of Dietrich. However, this device improves over Dietrich's device in that the hand resting surface is constructed of a cushioning material that gives with the pressure exerted by the hand. The sidewall of the rest is designed to be adhered directly to the sidewall of a mouse or keyboard, thus forming a single assembly. Unfortunately, with this configuration the two devices must move together, which frequently forces awkward positioning and fatigue of the arm and shoulder. Such a construction also limits the effectiveness of the device as it provides no means by which to adjust the distance between the mouse and the rest, thus making it impossible to accommodate differences in placement preferences or hand and wrist size. Thus there is a clear need for an improved palm, wrist or forearm rest that effectively supports these parts of the body during repetitive activities such as typing or accessing a mouse. Such a device would not provide a rigid rest surface, but rather would give with the pressure exerted by the hand so as to provide a more comfortable, custom-contouring rest. Such a device would also be attached to any standard keyboard, trackball or mouse in such a way as to be easily adjustable to accommodate user preferences. The present invention fulfills these needs and provides further related advantages as described in the following summary.

Otani U.S. Pat. No. 5,492,291 describes a keyboard forearm wrist rest that is solitary cushioned, rigid platform that positions the hands and wrists ergonomically in front of the keyboard. The lateral extensions of this solitary platform support the arms in a manner that minimizes damage to the vital structures of the wrists and reduces shoulder fatigue. The basic unit is attached to a rigid sheet which rests upon the workstation, upon which the keyboard, plus central processing unit, and/or monitor are placed. A second embodiment includes a keyboard platform which extends from the basic unit, that can be detached from the workstation proper.

Sanborn U.S. Pat. No. 105,001 describes an improvement in penman's hand-supports that relates to a new and useful device for supporting and forming a rest for the hand while writing or drawing, and is also intended to be used in schools for the purpose of training or teaching persons to hold their pens in a proper position.

The prior art does not teach a hand rest device for use with a mouse or trackball, etc. that has the ability to be easily manipulated for changing the angle in which the hand is supported. The present invention teaches this ability in an inexpensive device.

SUMMARY OF THE INVENTION

The present invention is an improved hand rest or supporting device that supports a hand during the use of a data input or entry device, such as a keyboard or an electronic pointing device such as a mouse or trackball. It consists generally of a base portion having a means for stable support on a work surface and for easily sliding the rest device on a work surface. It also includes an upwardly directed first means for mechanical engagement, plus a hand rest portion positioned, generally, over the base portion, the rest portion providing an upwardly directed means for receiving a hand in supported contact.

A surface contour of the receiving means naturally biases the hand in a preferred attitude so that the hand conforms to the angle of the surface contour.

The hand rest portion further providing a downwardly directed second means for mechanical engagement. The first and the second means of mechanical engagement are mutually engageable such that the preferred attitude of the contour surface is dependent upon the relative rotational positions of the rest and base portions. This allows the hand to be rested in a selected orientation, and to change the orientation at will. A means is provided for flexible attachment of the base to the data input means.

Thus it is an objective of the present invention to provide a hand rest device that has a rest surface capable of being adjusted easily for angle of tilt so as to find the most comfortable position for the user. It is a further objective to provide such a hand rest device that has the ability to be easily changed, as to the tilt angle so as to allow a user to vary his hand position frequently while working for the health of the wrist and other muscles in the hand and lower arm. It is a further objective of the present invention to enable the hand rest device to be manufactured at a very low cost in order to enable ownership of the device by any person working with a hand manipulated device.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a device for resting a hand, wrist, forearm or the like while working. In such drawings.

DETAILED DESCRIPTION OF THE PREFERRED EMBODIMENT

Figures 2, 3, 4:
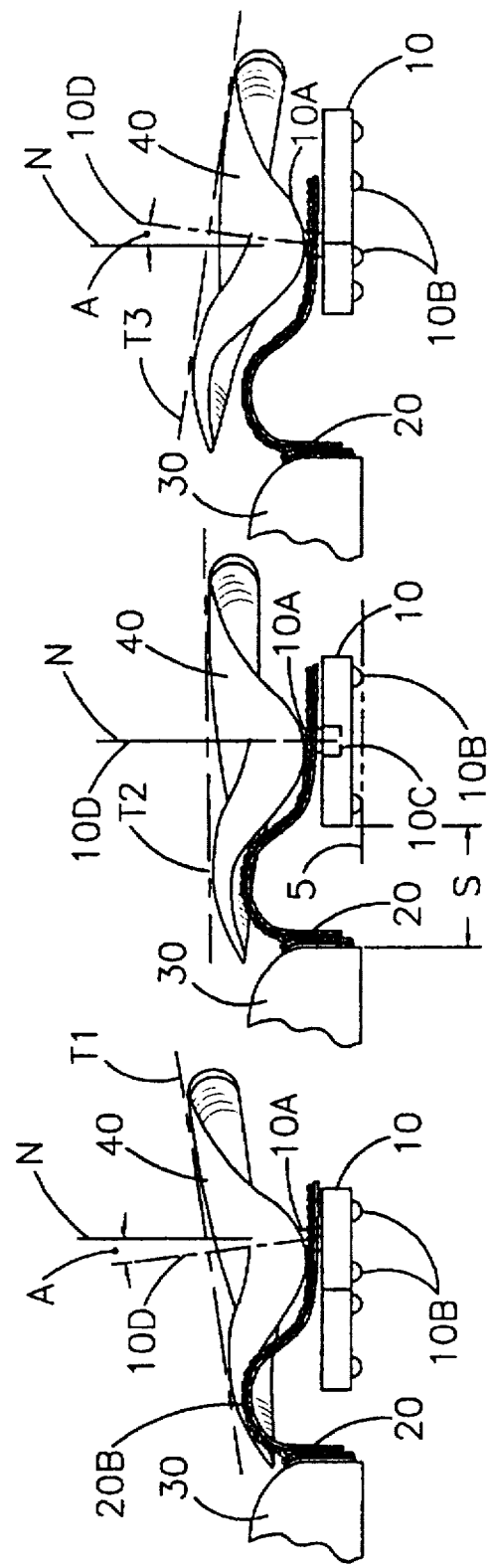
FIGS. 2, 3, and 4 are side elevational views of the hand rest device with the rotational relatonship between a base and a rest portion of the invention varied for adapting the attitude of the surface of the hand rest portion.

An adjustable hand rest device is operable on a work surface adjacent to a data entry means 30 such as a keyboard or electronic mouse pointing device. The hand rest device comprises a base portion 10 having a downwardly directed means for stable sliding 10B, such as a layer of low friction material (not shown), or a set of contact feet made of a low friction material, as shown in FIGS. 2–4. The stable sliding means 10B supports the rest device on the work surface 5 such that a hand of an operator may be rested on the rest device while using the data entry means 30. The hand rest device further includes an upwardly directed first means for mechanical engagement 10A. A hand rest portion 40 is positioned, generally, over the base portion 10, the rest portion 40 providing an upwardly directed means for receiving 40A of a hand (not shown) in supported contact thereon. The hand receiving means 40A biases the hand in a preferred attitude by virtue of its own attitude with respect to the work surface 5. The hand rest portion 40 further provides a downwardly directed second means for mechanical engagement 10C, as best seen in FIG. 3.

The first and the second means of mechanical engagement 10A, 10C are mutually engageable such that the preferred attitude of the hand rest means 40 is dependent upon the relative rotational positions of the base and rest portions 10, 40. A means for flexible attachment 20 of the base to the data entry means 30 provides a flexible and adjustable interconnection between these two components.

The first and second means for mechanical engagement 10A, 10C, are preferably a peg and corresponding hole respectively as shown in FIGS. 2–4. In this embodiment, is found a least cost approach to meeting the objectives of the present invention. The hole 10C may be molded into the base 10, and the peg 10A may be appended to the underside of the rest portion 40. The hole may be skewed from the normal N (true vertical) by a selected angle A as shown in FIGS. 2 and 4, or alternately the peg may be so skewed. Obviously, both peg and hole may be skewed from normal to provide a wide range of angles A. The attitude (tilt) of the rest surface 40A, as indicated in FIGS. 2–4 by the lines labeled T1, T2 and T3 respectively, is adjustable over a range of slopes from a positive tilt, where the palm of the hand is positioned higher then the fingers, shown in FIG. 2 by line T1, through a neutral tilt, where the palm and fingers rest at the same level, shown in FIG. 3 by line T2, to a negative tilt, where the fingers are positioned higher than the hand's palm, shown in FIG. 4 by line T3. Therefore, with the peg in hole approach, when the rest 40 is rotated about the base 10, the degree of tilt T, may be made to vary continuously over a selected range. Preferably, the value of T is: $-20 < T > +20$. This provides a wide range of rest surface attitudes so as to accommodate a range of different size hands comfortably, as well as different needs with respect to the bending of the wrist during work activities where the hand is rested on the rest device. The attitude of the wrist may be set for comfort or for assuring that the wrist remains healthy over long hours of work. Alternatively, the attitude may be changed periodically to assure that the wrist experiences a variety of attitudes.

Figure 1:
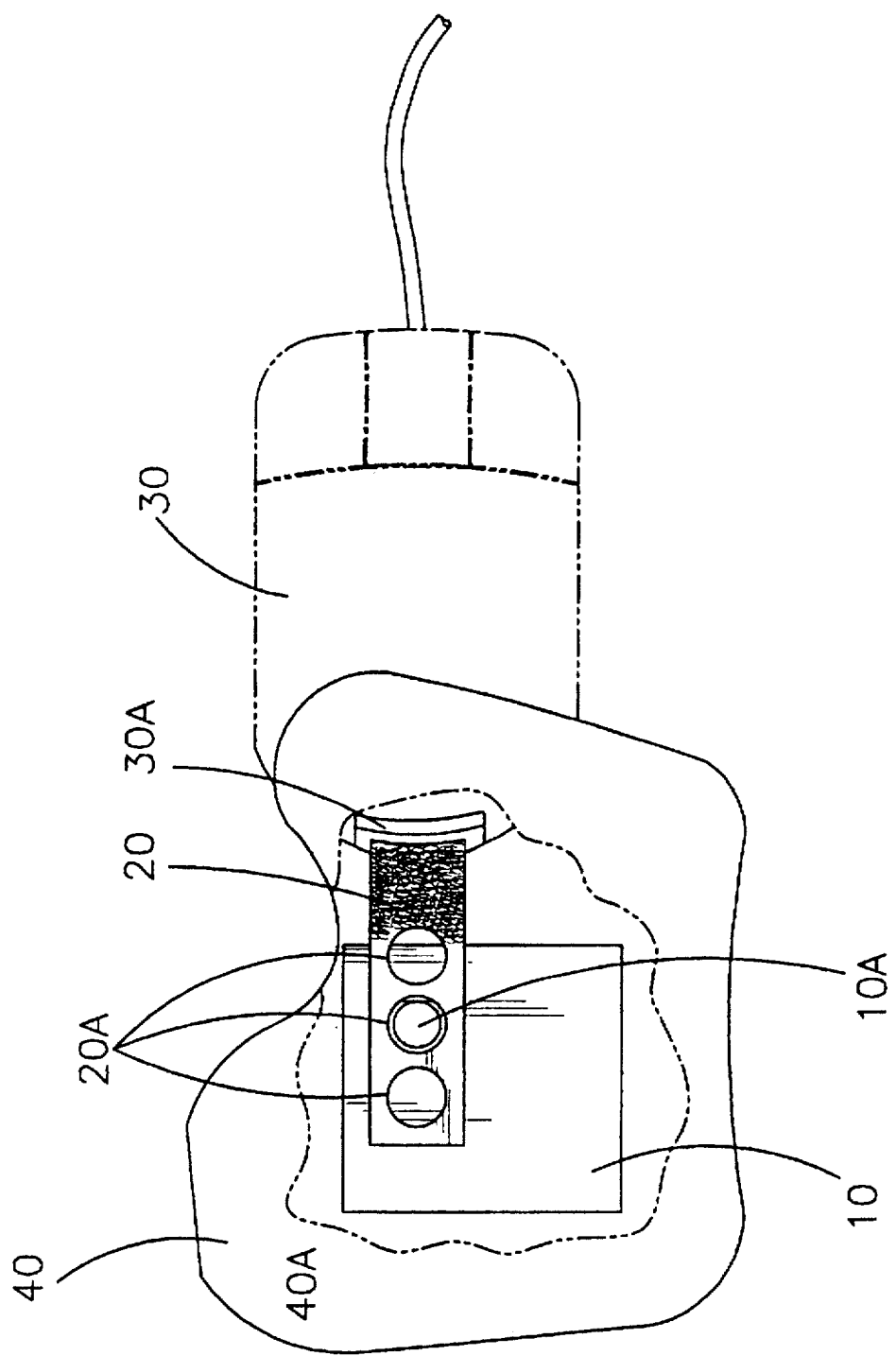
FIG. 1 is a top plan view of the preferred embodiment of the present invention, particularly showing a mouse pointing device and a hand rest device (cut away) interconnected by an adjustable, flexible strap.

Preferably the means for flexible attachment 20 is a strap as seen in the figures. The strap 20 provides a means for adjusting a space S (FIG. 3) between the base 10 and the data input means 30. The space adjusting means 20A is preferably a series of holes in the strap. The holes are adapted, as to size, for accepting the peg within any one of them, as best seen in FIG. 1. By selecting a hole of choice, the space S is made fixed within a range of movement depending on the loop 20B (FIG. 2) of the strap, since the strap 20 is fixed to the device 30 by a fixing means 30A. The strap 20 and fixing means 30A may be joined by any removable attachment means such as by a pin, snap engagement device, or other well known means, but the preferred manner of interconnection of the strap and the fixing means 30A is by a Velcro® attachment as shown in FIGS. 2–4. The loop 20B may be worked dynamically as with a mouse pointing device where the mouse is moved in small amounts in various directions, so that the loop 20B is curled-up and stretched-out as needed for moving the mouse while the hand rest device remains stationary. However, the hand rest device is able to move smoothly over the work surface 5 (FIG. 3) upon the sliding means 10B.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination for operating on a work surface, the combination comprising:
    a hand rest device comprising:
        a base portion having a downwardly directed means for stable sliding support of the rest device on the work surface, and an upwardly directed first means for mechanical engagement;
        a hand rest portion positioned, generally, over the base portion, the hand rest portion providing an upwardly directed means for receiving a hand in supported contact thereon, a surface contour of the receiving means adapted to bias the hand in a preferred attitude, the hand rest portion further providing a downwardly directed second means for mechanical engagement;

the first and the second means for mechanical engagement being mutually engagable in rotation whereby the attitude of the surface contour with respect to horizontal is dependent upon a relative rotational position of the hand rest portion with respect to the base portion; and a data input means adapted to rest and move upon the work surface in a position within fingertip grasp of the hand resting upon the hand rest portion, whereby the data input means may be manipulated by the hand while in a resting position.

2. The combination of claim 1 wherein the first and second means for mechanical engagement are a hole and a peg, wherein the hole is skewed from vertical by a selected angle.

3. The combination of claim 1 wherein the first and second means for mechanical engagement are a hole and a peg, wherein the peg is skewed from vertical by a selected angle.

4. The combination of claim 1 wherein the first and second means for mechanical engagement are a hole and peg, wherein the hole and the peg are both skewed from vertical by selected angles respectively.

5. The combination of claim 1 further including a means for flexible attachment between the base portion and the data input means.

6. The combination of claim 5 wherein the means for flexible attachment is a strap, the strap establishing a space between the base portion and the data input means and providing a means for adjusting the space between the base and the data input means.

7. The combination of claim 6 wherein the space adjusting means is a series of holes in the strap, the holes accepting the peg therein.

8. The combination of claim 5 wherein the means for flexible attachment is a strap, the strap establishing a space between the base portion and the data input means, and providing a means for adjusting the space between the base and the data input means.

9. The combination of claim 8 wherein the space adjusting means is a series of holes in the strap, the holes accepting the peg therein.

10. The combination of claim 5 wherein the means for flexible attachment is a strap, the strap establishing a space between the base portion and the data input means, and providing a means for adjusting the space between the base and the data input means.

11. The combination of claim 10 wherein the space adjusting means is a series of holes in the strap, the holes accepting the peg therein.

* * * * *